United States Patent
Stutz et al.

(10) Patent No.: US 11,703,591 B2
(45) Date of Patent: Jul. 18, 2023

(54) MEASURING DEVICE WITH MEASUREMENT BEAM HOMOGENIZATION

(71) Applicant: LEICA GEOSYSTEMS AG, Heerbrugg (CH)

(72) Inventors: Reto Stutz, Berneck (CH); Josef Lais, Marbach (CH); Jürg Hinderling, Marbach (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 802 days.

(21) Appl. No.: 16/200,440

(22) Filed: Nov. 26, 2018

(65) Prior Publication Data

US 2019/0196017 A1 Jun. 27, 2019

(30) Foreign Application Priority Data

Dec. 21, 2017 (EP) .................... 17209646

(51) Int. Cl.
*G01S 17/10* (2020.01)
*G01S 7/481* (2006.01)
*G01S 7/486* (2020.01)
*G01S 7/4865* (2020.01)
*G01S 7/4861* (2020.01)
(Continued)

(52) U.S. Cl.
CPC ............ *G01S 17/10* (2013.01); *G01C 15/002* (2013.01); *G01S 7/481* (2013.01); *G01S 7/4808* (2013.01); *G01S 7/4861* (2013.01); *G01S 7/4865* (2013.01); *G02B 27/0043* (2013.01)

(58) Field of Classification Search
CPC ........ G01S 17/10; G01S 7/4808; G01S 7/481; G01S 7/4861; G01S 7/4865; G01S 17/32; G01S 17/34; G01S 7/4814; G01S 7/4815; G01S 7/4816; G01S 7/4817; G01S 7/484; G01S 7/4863; G01S 7/4914; G01S 17/08;
(Continued)

(56) References Cited

U.S. PATENT DOCUMENTS 6,356,344 B1 * 3/2002 Ohishi ................. G02B 6/4206
356/5.1
6,516,286 B1 2/2003 Aebischer et al.
(Continued)

FOREIGN PATENT DOCUMENTS

CA 2304083 A1 10/2000
CN 1459033 A 11/2003
(Continued)

OTHER PUBLICATIONS

European Search Report dated Jul. 2, 2018 as received in Application No. 17 20 9646.

*Primary Examiner* — Daniel L Murphy
(74) *Attorney, Agent, or Firm* — Maschoff Brennan

(57) ABSTRACT

An optical measuring device having a base for placing the measuring device and a targeting unit that is rotatable with respect to the base and defines a target axis for targeting a target object that is to be measured. The targeting unit has a first beam path for emitting optical measurement radiation in the direction of the target object that is to be measured. The targeting unit furthermore has a diffractive optical element (DOE), which is arranged or arrangeable in the beam path such that the optical measurement radiation is homogenized.

19 Claims, 5 Drawing Sheets

(51) Int. Cl.
*G01S 7/48* (2006.01)
*G01C 15/00* (2006.01)
*G02B 27/00* (2006.01)

(58) Field of Classification Search
CPC .......... G01C 15/002; G01C 1/02; G01C 5/00; G01C 15/00; G02B 27/0043; G10S 7/4865
USPC ........................................................ 356/4.01
See application file for complete search history.

(56) References Cited

U.S. PATENT DOCUMENTS

| | | | |
|---|---|---|---|
| 6,747,733 | B2 | 6/2004 | Shirai et al. |
| 6,864,966 | B2 | 3/2005 | Giger |
| 7,643,955 | B2 | 1/2010 | Weilenmann |
| 7,864,303 | B1 | 1/2011 | Benz et al. |
| 7,911,589 | B2 | 3/2011 | Siercks |
| 7,982,859 | B2 | 7/2011 | Hinderling et al. |
| 10,101,665 | B2 * | 10/2018 | Zeitner ............... G03F 7/70075 |
| 2003/0123159 | A1 | 7/2003 | Morita et al. |
| 2006/0028961 | A1 | 2/2006 | Kim et al. |
| 2006/0092515 | A1 | 5/2006 | Kim et al. |
| 2008/0187012 | A1 * | 8/2008 | Yamauchi ............ H04N 9/3161 372/26 |
| 2009/0279069 | A1 | 11/2009 | Jensen et al. |
| 2010/0253931 | A1 | 10/2010 | Meier et al. |
| 2011/0122467 | A1 * | 5/2011 | Futterer ............ G02F 1/133524 359/9 |
| 2011/0194089 | A1 * | 8/2011 | Sigel ................... G03F 7/70091 355/67 |
| 2012/0113406 | A1 | 5/2012 | Bockem et al. |
| 2014/0307252 | A1 * | 10/2014 | Hinderling ........... G02B 26/004 356/141.4 |
| 2015/0341619 | A1 * | 11/2015 | Meir ....................... G01S 17/87 348/47 |
| 2020/0191959 | A1 * | 6/2020 | Zheng .................. G01S 7/4815 |

FOREIGN PATENT DOCUMENTS

| | | |
|---|---|---|
| CN | 1731238 A | 2/2006 |
| CN | 101923186 A | 12/2010 |
| CN | 102680983 A | 9/2012 |
| CN | 102803987 A | 11/2012 |
| CN | 104101335 A | 10/2014 |
| DE | 102 50 583 A1 | 5/2003 |
| EP | 1 043 602 A1 | 10/2000 |
| EP | 1 450 128 A1 | 8/2004 |
| EP | 1 467 222 A1 | 10/2004 |
| EP | 1 757 956 A1 | 2/2007 |
| EP | 1 791 082 A1 | 5/2007 |
| EP | 1 801 538 A2 | 6/2007 |
| EP | 1 882 959 A1 | 1/2008 |
| EP | 1882899 A1 | 1/2008 |
| EP | 1 311 873 B1 | 8/2011 |
| GB | 2 353 862 A | 3/2001 |
| JP | 3748112 B2 | 2/2006 |
| JP | 4843128 B2 | 12/2011 |
| WO | 2006/063739 A1 | 6/2006 |
| WO | 2011/141447 A1 | 11/2011 |

* cited by examiner

MEASURING DEVICE WITH MEASUREMENT BEAM HOMOGENIZATION

CROSS-REFERENCE TO RELATED APPLICATIONS

This application claims priority to European Patent Application No. 17209646 filed on Dec. 21, 2017, which is incorporated herein by reference.

FIELD OF THE INVENTION

The invention relates to a measuring device for coordinative measurement of a target object according to the preamble of claim 1 and to a coordinative measurement method according to the preamble of claim 13.

BACKGROUND

Coordinative measurement technology devices for measuring target objects frequently operate on the basis of optical measurement systems. These devices generally emit optical radiation, typically laser radiation, in the direction of the target object to be measured, from which a distance and an angular position—that is to say, polar coordinates of the target object—are determined which are typically subsequently processed further. The target object to be measured in the process reflects a portion of the emitted radiation back to the device, is received thereby and converted into an electrical signal for distance determination. In addition to the measurement of naturally present targets, it is also possible to affix special target marks or reflectors to the target object, or e.g. a mobile measuring stick is used as the target object.

The emitted optical radiation can be used here for electro-optical distance measurement on the basis of a time-of-flight or phase measurement principle or a combination of these principles, as is described for example in EP 1 757 956, JP 4 843 128, EP 1 311 873, EP 1 450 128, EP 1 882 959, EP 1 043 602, WO 2006/063739 or others.

The emitted optical radiation can also be used for the recognition and/or angle measurement of a target object. For example, a target mark can be embodied for example in the form of a retroreflector or of a visual feature of the target object, for example a corner, edge, boundary of a contrast area etc., such as for example described in WO 2011/141447 or EP 1 791 082. In this respect, optical radiation which is emitted in pulsed or continuous fashion can be emitted by the measuring device to support the recognition of the targets in the field of view. A recognition and/or measurement of this type of a target object in angle coordinates can be performed using a position-sensitive optical receiving element in the device, for example with an area sensor in CCD or CMOS technology, a PSD on the basis of the lateral photoelectric effect, or an arrangement of one or more photoreceptors, such as photodiodes, bi-cells, quadrature diodes, SPAD arrays etc.

For the angle determination, the measuring devices are typically provided with one or more angle meters or goniometers, with which the device or parts thereof can be rotated for targeting purposes and an angular position can be determined. The angle measurement of the target can be performed here using the angle meter evaluation by way of exactly targeting the target object using a target axis of the device. However, especially in the case of cooperative targets that are suitable herefor, it is also possible to perform imprecise targeting of the target object within a field of view of an optoelectronic angle measurement unit (ATR) of the device with the angle meters. By determining the deviation from ideal targeting within the field of view, the angle meter measurement value is subsequently corrected by this deviation (automatic target recognition or target direction measurement, ATR). A similar procedure is described for example in JP 3 748 112 or GB 2 353 862. In the measuring devices, the movements about the rotation axes of the angle meters can be performed manually and/or by way of a motor.

For distance and angle determination, it is possible in each case for a separate or a common radiation emitted by the device to be used, that is to say one and the same measurement beam or radiation source are used for both functions, or in each case one measurement beam for the distance measurement and one beam for the angle determination or target recognition. For measurements for non-cooperative targets, the divergence of the measurement beam must be as small as possible, preferably diffraction-limited, because otherwise the distance measurement would, on account of the undefined target object lighting, not provide the required measurement accuracy.

In coordinative measurement technology, high measurement accuracy is required both for angle determination and distance determination. For example, tachymeters or total stations are used in the field of surveying or geodesy, which have distance measurement accuracies of a few millimeters or even less than a millimeter. Measurement regions of a few kilometers are required here in measurements to triple prisms or retroreflective target marks, or a few hundred to a thousand meters and more for reflector-free measurements. The accuracy of the angle measurements typically lies in a range of less than 2 to 10 arcseconds, preferably 1 arcsecond, 0.5 arcsecond or below. These requirements are furthermore made more difficult by the fact that such measuring devices are often employed in rough environments with widely varying environmental conditions, such as temperature, humidity etc.

By integrating an ever increasing number of functionalities in the measuring device, the optical paths or beam paths inside the device become ever more complex. Measuring devices can have for example beam paths for distance measurement, visible pilot beams, automatic target search, automatic target recognition, automatic target alignment, sight observation, overview cameras, zoom functions, image recording, target lighting, optical data communication, internal reference sections etc. Not only is the device design made more difficult by the high number of the optical components required, but also the properties of the measurement beam are influenced, possibly considerably negatively influenced.

The measurement beam properties or the measurement beam quality plays a decisive role for the measurement accuracy. Impairment of the measurement accuracy comes about in the case of coherent measurement radiation for example due to the occurrence of so-called speckles, that is to say optical interference due to backscattering at an object surface, which results in a variation of the intensity of the reception signal. Measurement inaccuracies furthermore come about inter alia due to a profile of the measurement beam that is unfavorable especially for measuring corporative target objects, frequently a so-called Gaussian profile. In addition, the lateral or radial intensity distribution of a light pulse is time-dependent, the result of this being a time-dependent and angle-dependent lighting field. Due to these factors, e.g. the measured distance from a target object is disadvantageously dependent on the direction to the target and it is additionally not constant over time. That means that for one and the same actually present distance from the target that is to be measured, different distances are measured for measurements at different times and at different angles with respect to the target; in other words, a measurement uncertainty is present.

Furthermore, target recognition is made more difficult with inhomogeneous illumination of targets and also with changing polarization.

SUMMARY

It is therefore an object of some embodiments of the present invention to provide an improved measuring device for coordinative measurement of target objects or an improved coordinative measurement method.

A special object is the provision of such a measuring device with an improved measurement beam.

These objects are achieved by the subject matters of the independent claims and are advantageously refined by the features of the dependent claims. Further advantages of the invention can be gathered from the description and the associated figures.

An object of some embodiments of the invention is an optical measuring device for coordinative measurement of a target object, for example a tachymeter, a total station, a laser tracker, a laser scanner or a laser leveling device. The measuring device has at least one light source, preferably a laser source, for generating at least one optical, in particular pulsed, measurement beam. The device furthermore has a targeting unit that is rotatable about at least one axis, in particular about two axes, with respect to a base of the measuring device, wherein the targeting unit defines a target axis for targeting a target object that is to be measured, in particular a cooperative target object, and has a beam path for guiding and emitting the optical measurement beam in the direction of the target object that is to be measured, and a receiving optical unit. The beam path for this purpose has, for example, an optical unit or optical elements as known from the prior art. The targeting unit furthermore has at least one diffractive optical element (DOE). The DOE is embodied such and arranged or arrangeable (the DOE in preferred embodiments is not permanently arranged in the beam path, but can be arranged there entirely, from case to case, or depending on the type of application, measurement task or target object, or partially, for example, in the case of the presence of a DOE that is divided into different effective zones) in the beam path such that the measurement beam is homogenized before emission. Homogenization is understood here to mean unifying the measurement beam or, if appropriate, a measurement beam pulse, such that inhomogeneities or non-uniformities or unequal distributions or spatial or time variations of the intensity and the spectral distribution of the measurement beam are eliminated or at least significantly reduced due to mixing.

For example, the diffractive optical element is embodied for mixing the measurement beam, in particular for producing a multiplicity of at least partially overlapping partial beams which are placed one next to the other. Due to mixing, unequal distributions are leveled, as it were, and a uniform or at least more uniform measurement beam, that is to say a homogenized measurement beam, is obtained.

The diffractive optical element is embodied as an option for homogenizing the temporal and/or spatial intensity distributions within the measurement beam. Alternatively or additionally, the DOE is embodied for homogenizing the modes of the measurement beam in the object space, preferably by mixing thereof, and/or for homogenization of the optical wavefront of the measurement beam, in particular smoothing thereof, and/or imaging of the light source in the far field. The mixing and thus the leveling of the wavefront is performed here e.g. by way of decorrelation of the optical phases at the phase plate. As a further addition or a further alternative, in devices with pulsed measurement beam, homogenization is effected by way of the DOE of the time of flight of a measurement beam pulse that varies over the beam cross section.

In a development of the measuring device, for temporal homogenization, the relative position of the measurement beam and the diffractive optical element is dynamically, in particular periodically, variable, preferably by way of the diffractive optical element being arranged or arrangeable in the beam path to be movable such that the element is dynamically movable over the entire measurement beam. For example, the DOE is vibrable, in particular perpendicularly to a propagation axis of the measurement beam, and/or rotatable, in particular rotatable a propagation axis of the measurement beam or an axis that has a parallel offset with respect thereto or with eccentricity.

In an additional or alternative development, the DOE is embodied for changing the beam profile of the measurement beam, in particular in the far field, or for measurements to target objects which are arranged further away. For example, a Gaussian beam profile (as a typical example of a profile having a non-uniform, inhomogeneous intensity distribution) is homogenized into a top-hat beam profile. Alternatively or additionally, the DOE is embodied to reduce or eliminate temporal and/or direction-dependent inhomogeneities of the measurement beam, in particular intensity inhomogeneities in the longitudinal direction with respect to the beam path and spectral intensity inhomogeneities in the lateral direction with respect to the beam path.

Arranged or arrangeable in the beam path as a further option is at least one further diffractive optical element, which is likewise configured for homogenizing the measurement beam, in particular in cooperation with the above-mentioned first DOE.

Optionally, the diffractive optical element is embodied for divergently emitting the measurement beam, in particular at a divergence angle of at most 3°, typically 0.075°, 0.1°, 0.2°, 1° or 1.5°. The divergence is preferably adapted to the receiving angle or the field of view (FOV) of the receiving optical unit, such that it is optimally lit by the measurement beam that is scattered back or reflected back by the target. As a further option, automatic switching of axial focusing of the beam path between divergent and collimated is performable, e.g. by way of an automatic change in the relative position of the diffractive optical element with respect to the measurement beam or beam path.

The targeting unit is optionally embodied such, and the diffractive optical element is arranged in the targeting unit such, that the measurement beam coming from the diffractive optical element propagates as a free beam. As a further option, the entire beam path for emitting the measurement beam is free from light guides, that is to say the measurement beam passes through the entire beam path as a free beam. The light source is preferably a laser diode, wherein in particular the laser diode is embodied as an edge emitter. The measuring device furthermore preferably has an optoelectronic distance meter, and the measurement beam is suitable for determining a distance from the target object using the optoelectronic distance meter. The light source is then e.g. a constituent part of the distance meter, and the measurement beam is used only for distance determination.

Alternatively, the measurement beam also serves for further measurement tasks, e.g. as an ATR beam for automatic target recognition or target direction measurement. The diffractive optical element provides, due to decorrelation of the wavefront or modulation front of the laser beam, a laterally expanded light source of high homogeneity, which is no longer limited to a point or an emission line. This spatial expansion of the light source additionally has the advantage of greater admissible laser safety limits.

As an option, the measuring device has such automatic target recognition with an optical divergent target recognition beam, and the diffractive optical element is embodied such and arranged in a beam path of the target recognition beam such that the target recognition beam is homogenized before emission. As mentioned, the target recognition beam is the measurement beam or an additional light beam. For example, a divergent measurement beam, having a divergence of 1.5°, is produced in the object space by way of a diffractive optical element (and possibly or optionally a transmission optical unit of appropriate design). The divergence produced by way of the hologram can here be selected freely optionally within a certain range by way of the fact that the divergence in the object space can be set using a lens optical unit and stop arrangement, arranged downstream of the hologram. The diffractive optical element can therefore also be embodied to produce divergences of the measurement beam of greater than 1.5°, but preferably no more than 3°.

The production of a divergent measurement beam due to the diffractive optical element is used, as a further option, alternatively or additionally for the optoelectronic distance meter which may be present depending on the case. The divergence is then preferably approximately 0.2°. The diffractive optical element can be embodied such that different divergences are thus producible, e.g. in dependence on whether it is currently used for target recognition or distance measurement. In order to be able to produce different divergences with a DOE, the latter is divided e.g. into zones of different divergence production. Alternatively, the targeting unit has a plurality of DOEs with different divergence production properties (and/or homogenization properties), which are arrangeable in the beam path depending on the requirement e.g. by way of a translational and/or rotational displacement mechanism.

The diffractive optical element is optionally embodied in the form of an optical diffuser, in particular with a scattering angle of at most 3°, and/or is produced by way of replication technology, in particular wherein the diffractive optical element has a coating material which has been applied by way of replication technology, in particular having a layer thickness of less than 0.15 mm, specifically less than 0.05 mm. Alternatively or additionally, the DOE consists of glass, in particular crown glass, plastic or combinations of glass and plastic. As a further option, the DOE is embodied in the form of a hologram, in particular of a structure hologram, and/or as a hybrid lens from a refractive, in particular aspheric or spherical, lens having a diffractive structure. As a further option, the diffractive optical element is polarization-maintaining, i.e. it does not change the polarization of the incident or passing measurement radiation. This makes it possible to transmit using the transmission beam an additional polarization-based modulation or coding. This can be utilized e.g. for phase-modulated distance meters or for target object coding.

As a further addition or a further alternative, the diffractive optical element is embodied for suppressing the zero order of diffraction and/or diffraction orders greater than one, in particular by producing large scattering circles in the case of a diffraction for these diffraction orders, in particular with a remaining intensity of higher orders of diffraction with a proportion of less than 5% of an overall intensity.

A part of some embodiments of the present invention is furthermore a method for coordinative measurement of an, in particular cooperative, target object with an optical measuring device, e.g. a theodolite, a laser scanner, laser leveler or a total station. As part of the method, the target object is targeted with a target axis of a targeting unit of the measuring device, wherein the targeting is performed with emission of optical, in particular pulsed and/or divergent, measurement radiation, in particular laser radiation, along a first beam path in the direction of the target object, in particular of the target object which is placed in the far field, that is to say e.g. at a distance of at least 10 m or 15 m. Furthermore as part of the method, homogenization, in particular temporal and/or spatial homogenization, of the measurement radiation is performed before the emission using a diffractive optical element in the beam path.

The homogenization by way of the DOE optionally means unifying the temporal and/or spatial intensity distribution of the measurement radiation and/or of the modes of the measurement radiation in the object space. Alternatively or additionally, the homogenization means unifying the wavefront of the measurement radiation, in particular the smoothing or leveling thereof, and/or in the case of pulsed measurement radiation, of the time of flight of a measurement radiation pulse.

A further object of some embodiments of the present invention is a computer program product with program code, which is stored on a machine-readable carrier, in particular an above-described, coordinative measuring device, or computer data signal, embodied by an electromagnetic wave, for performing the abovementioned method.

The method according to the invention and the apparatus according to the invention will be described in more detail below purely in the form of examples on the basis of concrete exemplary embodiments that are illustrated schematically in the drawings. Further advantages of the invention will also be explained at that point. In detail:

DETAILED DESCRIPTION

Figure 1:
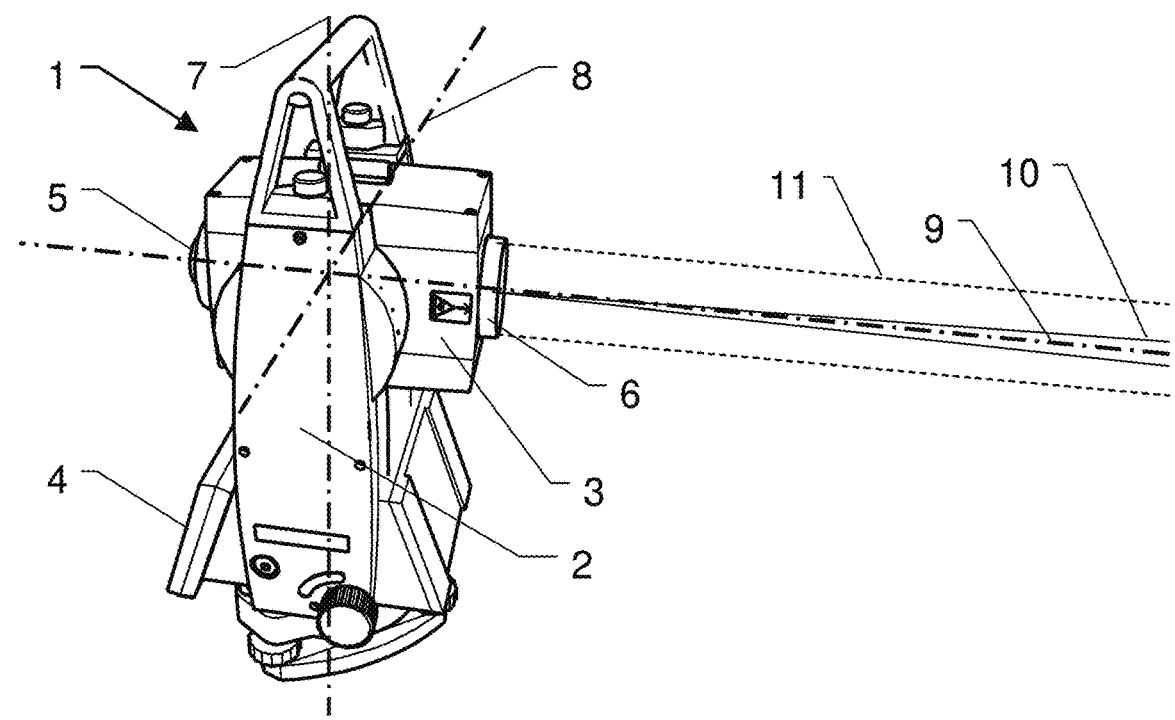
FIG. 1 shows an example of an embodiment of a measuring device within the meaning of the present invention.

FIG. 1 shows an example of a geodetic optical measuring device 1, in which the present invention is employed. The device 1 has a base with which it is stationed for measuring purposes, e.g. by way of a stand (not illustrated here).

Arranged on the base, with a vertical goniometer that is rotatable about a standing axis 7, is a device body 2 of the device 1. The base has means for the horizontalization of the device 1—in other words for the vertical adjustment of the standing axis 7, for example using three adjustment screws and a circular level and/or an electronic level. The device body 2 has an operating unit 4 and is connected to the targeting unit 3 by way of a tilt-axis goniometer that is rotatable about the tilt axis 8. The targeting unit 3 in the case shown has a telescope having an objective 6 and an eyepiece 5; in other words is provided with a sight channel. Other embodiments can have, in addition or alternatively to the optical telescope, a digital eyepiece and/or a display on the operating unit 4 or an external control device. The targeting unit 3 defines a target axis 9, which in the ideal case is exactly perpendicular to the tilt axis 8 of the tilt-axis goniometer, which in turn is perpendicular to the vertically aligned standing axis 7 of the vertical goniometer. The three axes are thus movable at least approximately orthogonally with respect to one another, and the target axis 9 is movable by way of a movement of the targeting unit 3 that defines it with respect to the base about two axes. A distance measurement is performed in the direction of the target axis 9 using an optoelectronic distance meter in the targeting unit 3, the optical axis of which corresponds to the target line in the ideal case of the target axis 9.

Consequently, the device 1 can measure a targeted target object, for example a retroreflector or a reflection target mark, using the two angle meters and the distance meter in polar coordinates. The polar coordinates can consequently also be converted to other coordinate systems, or it is possible, on the basis thereof, to perform more complex measuring tasks and calculations, which is performable e.g. via the operating unit 4 in a manner controlled by a device-internal digital computer or with an external computer.

The optoelectronic distance meter in the example shown is configured such that the beam path of emitted optical measurement radiation 10 and the beam path of the optical radiation 11 received by the device 1 has an at least approximately common optical axis, which, in the ideal case, also coincides with the target axis 9. A main prerequisite is here that it is ensured at least that the optical axis of the receiver is aligned with the target line of the transmitter such that the field of view of the receiver captures the light spot of the transmitter on the target object.

The embodiment shown is an optical measuring device 1 having a base for placing the device 1 and a targeting unit 3 that is rotatable with respect to the base about two axes 7 and 8, which are provided with angle meters. The targeting unit 3 here has a target axis 9 for targeting a target object 40 that is to be measured, wherein targeting can be performed e.g. by way of a sighting telescope and/or via the target axis of the measurement beam 10 (or optionally also of a separate targeting beam, e.g. a laser pointer). The targeting unit 3 furthermore has a beam path for emitting optical measurement radiation 10 in the direction of the target object that is to be measured and a further beam path for receiving a portion of the optical measurement radiation 11 that is reflected by the target object by way of an optoelectronic receiving element, wherein both beam paths can be at least partially congruent.

The properties of the emitted measurement beam 10 have significant importance with respect to the measurement accuracy. The accuracy of a distance measurement is also influenced by the target itself. In a retroreflector, inevitably a spatial selection of the modulation wavefront of the emitted radiation is effected, which can result in systematic distance deviations. In reflective tapes and diffusely reflective targets, speckles occur, which produce chromatically induced measurement deviations. In the case of natural target objects, the reflectivity often varies over the surface, which results in a spatial weighting of the incident measurement beam 10 and, if an inhomogeneous modulation wavefront is present, the absolute distance measurement accuracy is reduced.

A reduction in the measurement accuracy occurs inter alia in the case of laser radiation or coherent radiation due to the occurrence of so-called speckles. Specifically, but not only, in the case of ATR, the presence of speckles interferes with the direction measurement and reduces the angle accuracy of the ATR. Another problem arises for the precision that is required nowadays by way of spatial or temporal variation of the measurement beam 10 or of measurement beam pulses. In particular when laser diodes are used as the radiation source, such disadvantages arise, because they emit radiation non-uniformly over their entire active surface. For example, the waveform has irregularities or the waveform varies depending on the emission angle.

There is a requirement for beam homogenization both in diffraction-limited collimated measurement beams 10 in the case of the measurement of reflector-free targets and also in the case of divergent measurement beams for retroreflective target marks.

Figure 2A:
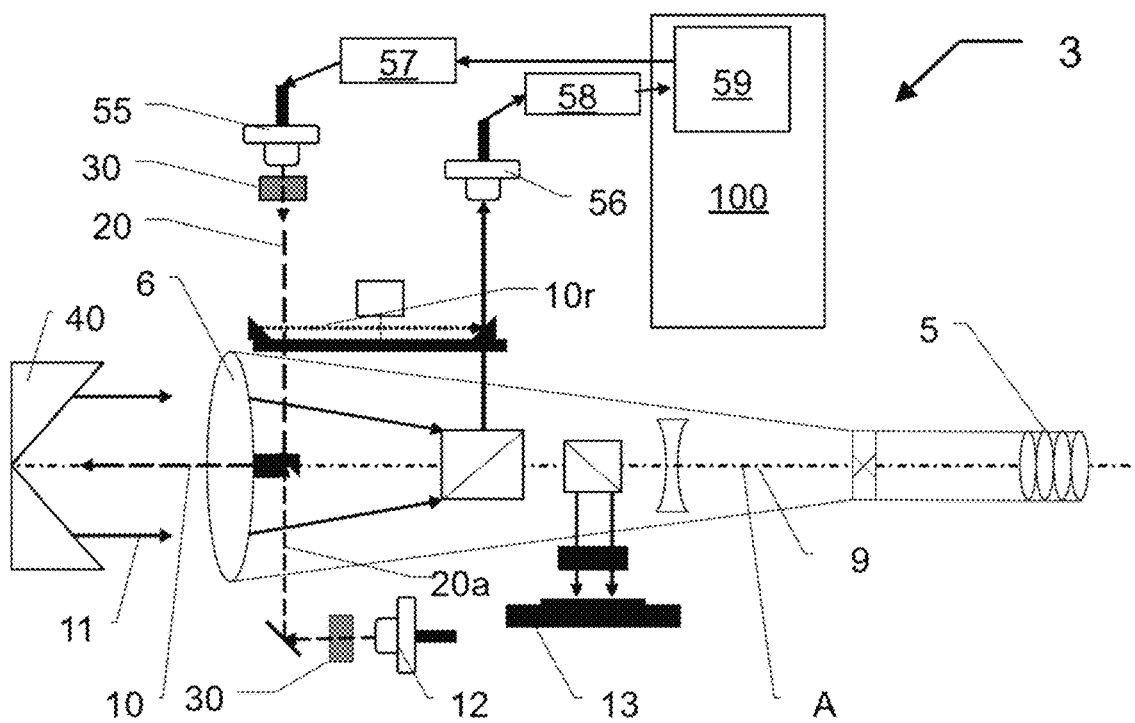
FIG. 2a shows a schematic illustration of an internal construction of a first embodiment of a measuring device according to the invention.

FIG. 2a shows an example of an internal construction of a first embodiment of a targeting unit 3 of a measuring device 1 according to the invention, for example a geodetic measuring device 1, which eliminates or at least significantly reduces the disadvantages mentioned. The components shown in this example and the arrangement thereof should be considered to be purely schematic, and can also vary in other embodiments, or parts thereof can also be omitted, supplemented, or moved within the device body 2.

The device 1 is, as in FIG. 1, provided with a sight channel, that is to say has an eyepiece 5 through which light entering the objective 6 can be observed. Alternatively or additionally, the observation image can be recorded by a camera 13 and said image can be observed on a monitor or display, which is produced by way of the objective 6 and further optical units (not illustrated) in the device 1. All optical components that are essential in this system are aligned with a common optical axis A or referred to a common optical axis A (for example with a known misalignment or allowance of the axes of the respective components with respect to one another). The optical axis A of the observation in the case shown corresponds to the target axis 9 of the device, which can be made identifiable during observation by way of a targeting aid, such as a crosshair or the like.

Furthermore shown are a few essential parts of the optoelectronic distance meter (EDM). The control unit 100 of the device 1 is connected to the EDM controller 59, which controls, by way of a driver stage 57, the emission of optical measurement radiation 10, preferably laser radiation, by the light source 55. The light source 55 is embodied for example as a semiconductor light source, for example as an edge-emitting laser diode (spatially single-mode or multimode) or as a laser light source in the form of a solid-state laser, a fiber laser or a MOPA (seed laser with optical amplifier) or a combination thereof. There may be one or more light sources 55, which can exhibit e.g. different optical properties, such as wavelengths, polarization etc. It is also possible to use a semiconductor laser element, with which more than one wavelength of light is emittable. By way of example, it is possible to provide only a single transmitter with a correspondingly spectrally broadband emission spectrum and to use it, by combination with corresponding filters, objectives or optical elements, such as a diffractive optical element described below, to emit in alternation radiation of different wavelength ranges and divergences. Provided for example is a first wavelength for automatic target recognition, said first wavelength being in the infrared or in the visible range, and a second wavelength for the distance measurement beam in an infrared range that deviates therefrom, and the wavelength of a pointer beam is in the visible range of light.

Provided in the beam path 20 for guiding and emitting the light of the light source 55 of the device 1 is, in the embodiment shown here, in accordance with the invention, a diffractive optical element 30 (DOE), that is to say an optical element that influences the light path or measurement beam 10 by way of diffraction. The DOE is here embodied such and arranged in the beam path 20 such that the measurement beam 10 is homogenized, i.e. non-uniformities are reduced or minimized or eliminated, or to reduce or eliminate temporal and/or direction-dependent inhomogeneities of the measurement beam such as intensity inhomogeneities or the mode distribution. The arrangement of the DOE 30 is, as shown in the example, in the free beam. The measurement beam 10 is therefore, after passage through the DOE 30, freely emitted onto the target to be measured, and the measurement beam 10 coming from the DOE 30 is not coupled into a light guide. The emission of the measurement beam 10 onto the target without using a light guide has the advantage of high transmission and prevention of backscatter at the ends of optical fibers, which could lead to distance measurement errors. In addition, light guides have the general disadvantage that they are not polarization-maintaining.

Optionally, the hologram can be pivoted into and out of the beam path 20. This is particularly advantageous in diffraction-limited laser beams with the smallest possible divergence. In the pivoted-out state, the divergence of the transmission beam 10 is not increased, and the light spot on the target object consequently has the smallest possible extent. By contrast, if the DOE has been pivoted into the measurement beam 10, the divergence of the beam is increased and homogenized at the same time, which effects a high measurement accuracy onto reflective targets such as target marks or retroreflectors.

The DOE 30 is here embodied for example in the form of an optical diffuser and/or hologram or produced using replication technology. As a further option, the DOE 30 consists of glass, plastic or a combination thereof. Furthermore, the DOE 30 can be embodied in the form of a hybrid lens from a refractive lens having a diffractive structure. The DOE 30 is furthermore optionally embodied for suppressing the zero order of diffraction or orders of diffraction greater than one.

As a further option, the DOE 30 is polarization-maintaining, as a result of which the polarization of the measurement beam 10 can be defined and known, with the result that in this case the polarization of the returning beam 11 is also known, which offers e.g. advantages with respect to filtering of the incoming light or makes possible omission of a polarization-independent beam splitter. Here, the beam path 20 or the optical elements provided therein can overall be embodied such that the polarization of the measurement beam 10 is maintained.

In a further embodiment, two DOEs can be arranged one behind the other. Hereby, a higher degree of beam homogenization in particular in the near field is achieved. Furthermore, the diffractively optically effective layers can be applied on both sides on a common carrier plate having a thickness of only a few millimeters. This gives the DOE a compact installation size and has a strongly homogenizing effect not only in the case of great but even at short object distances.

According to the invention, the DOE mentioned or—as illustrated—a further DOE 30 may also be present for the homogenization of a target recognition beam of an automatic target recognition system (ATR). In the embodiment illustrated, the beam path 20a with the ATR light source 12 has a further DOE 30, which can optionally be additionally present according to the invention. The area sensor 13 acts as a position-sensitive or direction-sensitive sensor of the ATR and is embodied, for example, in the form of a PSD sensor or as a CCD or CMOS image sensor.

If a plurality of light sources 55, 12 are present, it is also possible in accordance with the invention for a single DOE 30 to be used for the homogenization of the respective measurement beam 10, 10a or for a single light source or a single measurement beam in a single, common beam path 20 with a DOE 30 to be used e.g. for distance measurement and for automatic target recognition.

Also shown is a reference light component 10r of the measurement radiation 10, which is guided, via a device-internal reference section, to a measurement light receiver 56, as a result of which a distance measurement in accordance with the time-of-flight principle can be effected.

Since the distance meter is, as described, a coaxially constructed distance meter, the beam path of the measurement radiation 10 (and shown here also the target illumination radiation of the light source 12) is mirrored onto the optical axis of the objective 6 and consequently onto the target axis 9 of the device. The objective 6 in the example therefore also serves as a receiving optical unit. The measurement light 10 or at least part thereof is now reflected back by the target object 40. In the case shown, the target object 40 is embodied in the form of a retroreflector.

The back-reflected and received measurement light 11 is directed at a detection element 56 (e.g. a photodiode) of the EDM, which can be accomplished e.g. by wavelength-selective deflection. The detected light signal is consequently prepared as an electrical signal in block 58, and the distance measuring unit 59 determines a distance between the measuring device and the target object, for example in the form of a time-of-flight measurement, phase measurement, signal form evaluation or a combination of these principles.

The receiving beam path in the example is also directed onto a camera 13, e.g. with CCD or CMOS image sensor or PSD, but also or additionally as an RIM sensor, and to the eyepiece 5.

Figure 2B:
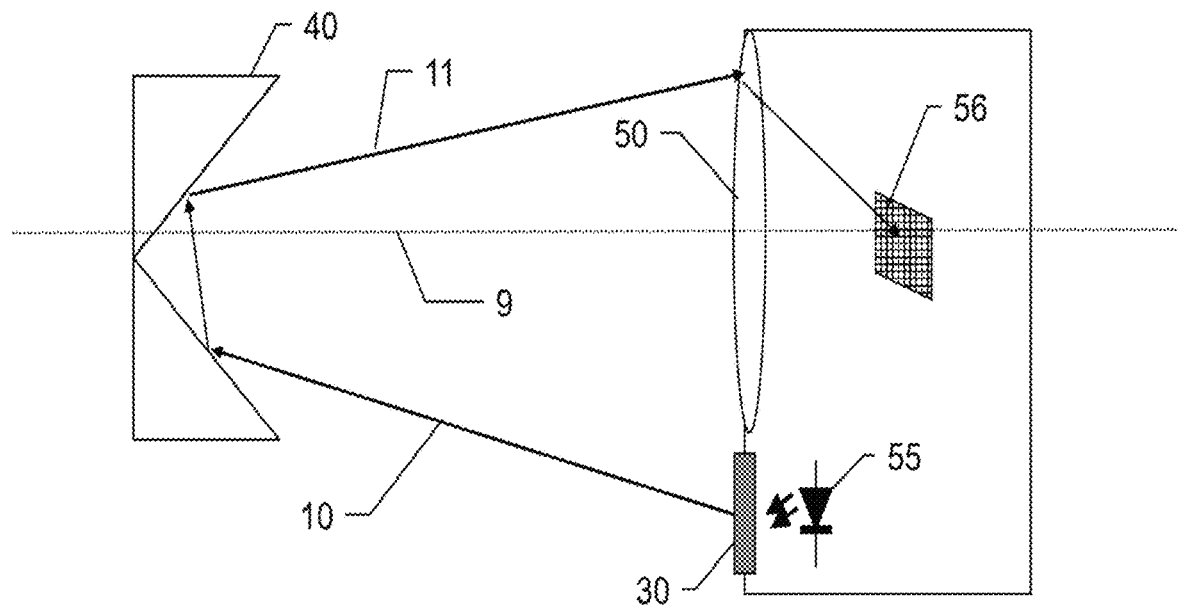
FIG. 2b shows a schematic illustration of an internal construction of a second embodiment of a measuring device according to the invention.

FIG. 2b shows parts of an embodiment as an alternative to that according to FIG. 2a, in which the emission of optical distance measurement radiation is effected biaxially with respect to the target axis direction 9 of the measuring device. The optical axis of the transmission beam path with the DOE 30 for emitting measurement radiation 10 thus clearly deviates from the receiving beam path of the objective lens 50 for receiving measurement radiation 11 that is reflected back by the target object 40 and guiding it to the detector 56 with the target axis 9, for example by way of using herefor—as shown—in each case dedicated optical units 50, 30 which are arranged next to one another. The DOE 30 is arranged in the optical beam path 20 as a free-beam element, that is to say the measurement beam 10 propagates as a free beam (at least after passage through the DOE 30, but preferably along the entire beam path 20). By way of the DOE 30, the measurement beam 10 is homogenized, such that non-uniformities are reduced or eliminated. In particular, temporal and direction-dependent inhomogeneities of the measurement beam 10, such as inhomogeneities of the temporal phase, the intensity and any radiation modes that may be present, are reduced or eliminated by the DOE 30. The arrangement, consisting of radiation source 55 for emitting measurement radiation 10 and of DOE 30, can also be arranged in multifold embodiment axisymmetrically about the target axis 9, as a result of which firstly the irradiance of the target object is increased and secondly the homogenization of the measurement radiation 11 is additionally improved.

Figure 3A:
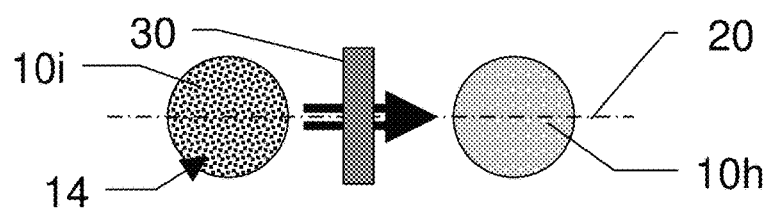
FIGS. 3a, 3b and 3c show schematic illustrations of a homogenization according to the invention.

FIG. 3a shows an example of a homogenization according to the invention of a measurement beam using a DOE 30. Performed in the example is a compensation of speckles or an adaptation of the modulation wavefront of the laser beam 10i (illustrated in the cross section that is rotated about 90° with respect to the beam path 20) coming from the laser diode, such that the beam 10h after passage through the DOE no longer exhibits these variations or exhibits them to a significantly reduced degree.

Figure 3B:
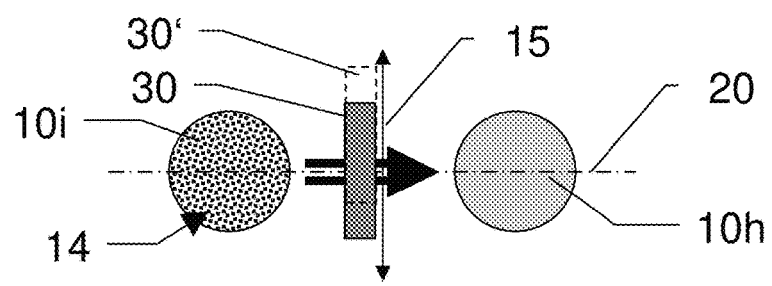

FIG. 3b shows an embodiment which is further improved. In a development of the embodiment according to FIG. 3a, here, the DOE 30 is movably arranged in the beam path 20 (indicated in the drawing by the dashed representation 30' in a second position relative to the beam path 20). Due to a cyclic or periodic movement 15 of the DOE 30 using corresponding actuators (not illustrated) perpendicular to the beam path 20 or to the propagation axis of the measurement beam 10i, a further blurring of speckle effects or mixing of the measurement beam 10i is effected. This vibration can be quite low in terms of the movement amplitude herefor and also for other types of homogenization of the measurement beam, but is effected with a great frequency, in particular with an amplitude, which sufficient for mixing the measurement beam or blurring the speckles and a frequency which is sufficiently fast to obtain an average of speckles during a measurement or over a plurality of measurements that are averaged for the measurement value formation.

Figure 3C:
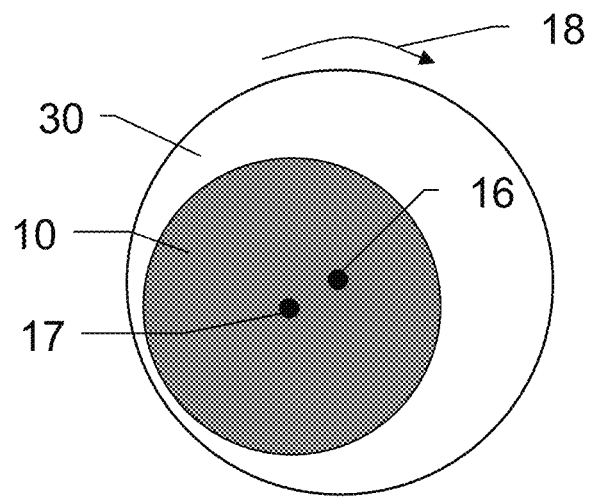

FIG. 3c shows an alternative of the embodiment according to FIG. 3b in cross section. Here, a dynamic variation of the relative position of DOE 30 and measurement beam 10 and consequently improved homogenization of the measurement beam 10 are achieved by way of the DOE 30 rotating relative to the measurement beam 10, wherein the rotation is effected for example using a motor directly by way of the rotation axis or indirectly by way of corresponding transmission elements (not illustrated). In the example, the rotation axis 16 is offset relative to the beam axis 17, with the result that eccentric rotation is effected. Instead of a co-rotating rotational movement 18, as illustrated, an oscillating movement of the DOE 30 relative to the measurement beam can alternatively be effected. The rotational movement is here effected likewise quickly such that a sufficient homogenization or mixing of the beam 10 is obtained during the measurement time of a distance or direction measurement.

As a further alternative, with respect to the embodiments according to FIGS. 3b and 3c, it is not the DOE 30 that is moved in the beam path, but a relative movement of the measurement beam with respect to the DOE 30 is achieved by way of moving the measurement beam, for example by way of a variable optical element that is connected upstream or by variation/movement of the light source itself.

In a further embodiment, the DOE 30 can be pivoted into and out of the beam path 20. In the pivoted-in-state, it can be either arranged statically or be displaced with a cyclic movement 15, 18 over the beam path 20.

Figure 4:
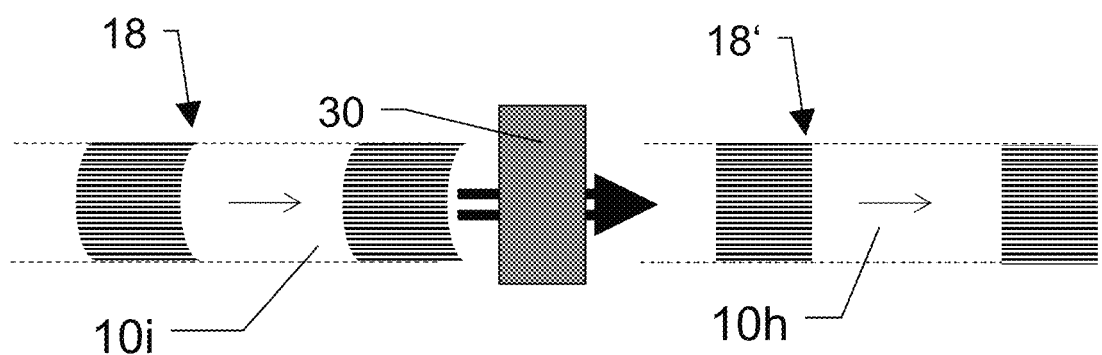
FIG. 4 shows a schematic illustration of a further example of a homogenization according to the invention.

FIG. 4 shows an adaptation of the modulation wavefront of the intensity of pulsed emitted radiation as a further example of a homogenization in accordance with the present invention. Optoelectronic apparatuses such as distance meters, ATR or target search unit typically operate with temporally modulated transmission beams. The measurement accuracy of such a measurement apparatus is influenced, inter alia, by the evenness or uniformity of the modulation or intensity wavefront 18 of the radiation 10 used. Due to a DOE 30 according to the invention, a homogenization of the modulation wavefront 18 is effected, in particular a generation of a smooth modulation wavefront 18' of the emitted optical radiation at the target object or in the far field, or the modulation wavefront is brought into a different desired form, for example a level and consequently homogeneous form. In addition to static smoothing of the modulation wavefront 18, the latter can also be smoothed dynamically, wherein the improvement of the measurement accuracy comes about based on averaging over time.

Figure 5:
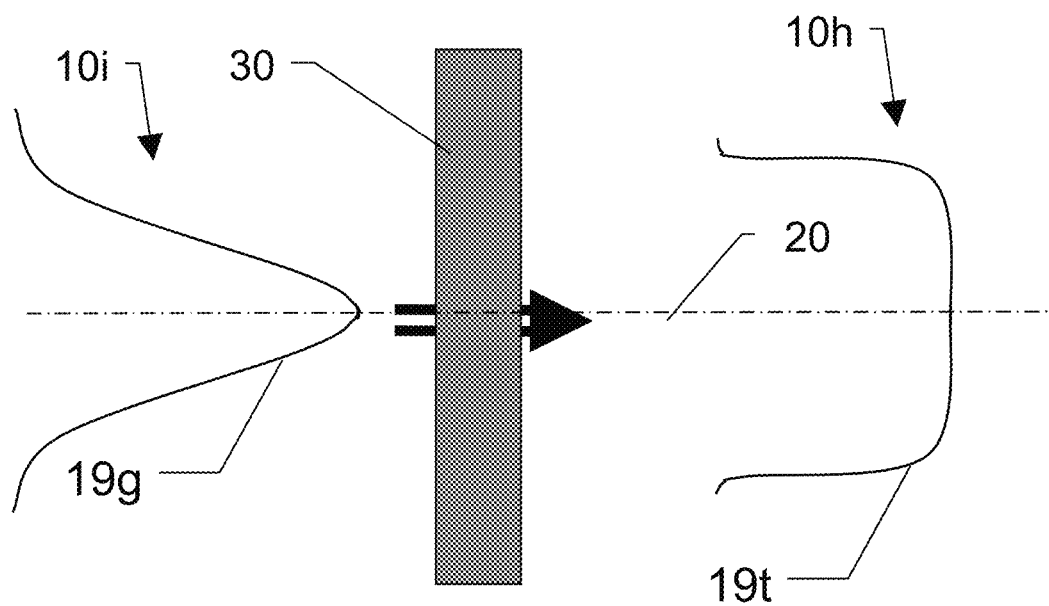
FIG. 5 shows a schematic illustration of a further example of a homogenization according to the invention.

FIG. 5 shows a further example of a homogenization according to the invention using a DOE 30 in the beam path. In the example, the DOE 30 is embodied such that a homogenization of the beam profile is effected, wherein the input beam 10i here exhibits a Gaussian profile 19g which is typical of laser sources. The light pulse 10i thus has, before it passes through the DOE 30, a non-uniform form or a spatially uneven intensity distribution. This has the effect, for example, that, depending on the spatial orientation of the light pulse 10i and the target object, or depending on the point of incidence on the target object, different times of flight are measured, because for example the peak of the pulse is incident earlier than a marginal region, which is disadvantageous with respect to highly accurate measurements. By way of the DOE 30 according to the invention, the input beam profile 10g is now shaped to form a homogeneous measurement pulse 10h having a square profile or a top-hat profile 19t, which represents a homogeneous beam profile with a uniform intensity distribution. This is advantageous in particular for measurements in the far field, that is to say where the angle divergence of the measurement beam becomes dominant or is dominant, or the beam divergence (significantly) exceeds the starting/exit diameter of the measurement beam.

Figure 6:
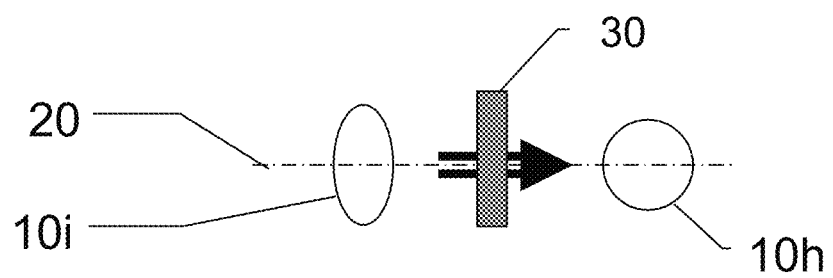
FIG. 6 shows a schematic illustration of a further example of a homogenization according to the invention.

FIG. 6 shows, in one type of illustration, like the FIGS. 3a and 3b, an example of a compensation according to the invention of different divergence angles of a laser beam 10i, which is emitted by a semiconductor light source and is used as optical radiation for measurement purposes in a measuring device according to the invention. A divergence which varies depending on the direction occurs for example when an edge emitter is used as the radiation source. By way of the DOE 30 that is used according to the invention in the measuring device, a beam modification can be effected in order to compensate, in axis dependency, the beam divergence such that the beam cross section is homogenized, as illustrated, from elliptical to circular. In the process, the transformation of the beam cross section is performed not by way of simple cylindrical zooming, but by mixing surface elements over the beam cross section, such that smoothing of the intensity and time-of-flight wavefront of the modulated laser radiation is obtained.

Figure 7A:
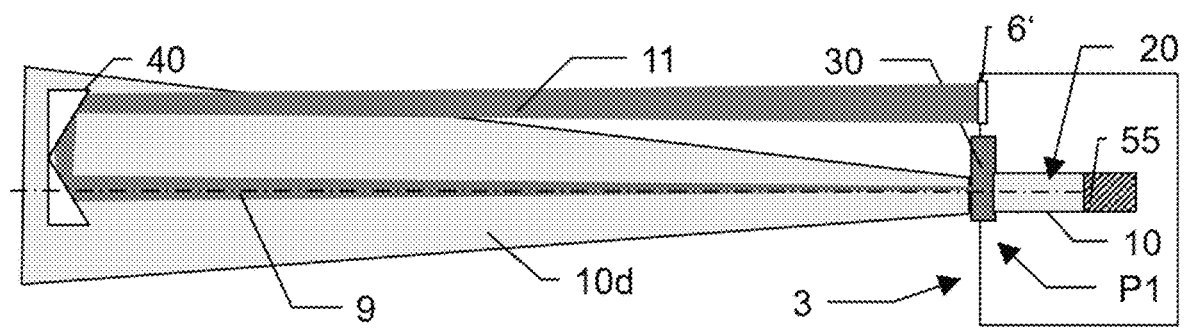
FIGS. 7a and 7b show schematic illustrations for a case-to-case modification of the measurement beam.
Figure 7B:
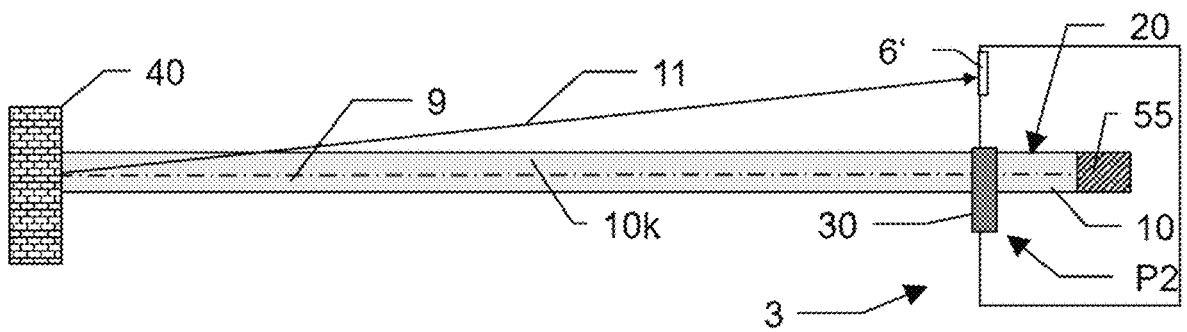

FIGS. 7a and 7b show a use of a DOE 30 according to the invention for producing a divergent measurement beam 10d and automatic switching between divergent measurement beam 10d and collimated measurement beam 10k. In FIG. 7a, the DOE 30 is embodied for example in the form of a hologram, in a first position in the targeting unit 3 (illustrated only sectionally), such that it is arranged in the beam path 20 and modifies the beam emitted by the radiation source 55. The DOE 30 in the example is embodied and arranged such that, in addition to homogenizing the measurement beam 10, it also modifies the latter such that it is incident on the target object 40 as a divergent beam 10d. Such a divergent beam 10d is employed, as illustrated, in cooperative targets 40 such as retroreflective films or triple prisms.

The divergence modification is here advantageously effected such that the receiving optical unit 6' (configured merely by way of example in contrast to the example of FIG. 2a as a separate unit) is optimally lit by the returning (component of the) measurement beam 11, that is to say the cross section of the receiving measurement beam 11 lights said receiving optical unit 6' completely, wherein, on the other hand, this effective component of the measurement beam 11 is cut out of a homogenized component of the divergent beam 10d via reflection at the cooperative target object 40.

In FIG. 7b, the DOE 30 is situated in a second position P2 such that only homogenization of the beam 10 is effected, with the result that the latter leaves the targeting unit 3 as a collimated measurement beam 10k, as is typically necessary e.g. for non-cooperative targets 40. The DOE 30 is to this end divided for example into two different regions or zones, wherein one region effects only homogenization, and the other effects homogenization and divergent emission. The change in position from P1 to P2 and consequently the switching from divergent to collimated, and vice versa, is here effected automatically, for example on the basis of automatic target recognition.

The DOE can also be provided with further regions which differ for example by way of the produced beam divergence. Alternatively to a change in position of beam path 20 to DOE 30, as illustrated, the DOE 30 can, for example, change its position relative to the beam path 20 by way of rotation, in a manner such that, depending on the rotational position of the DOE 30, the emitted measurement beam travels through different divergence zones and thus undergoes different (including no) divergence modification. As a further option, the targeting unit 3 has, instead of one DOE 30, at least two diffractive optical elements, wherein the first DOE only homogenizes and the second only produces divergence and, if required, is pivoted into the beam path 20. Alternatively, the first DOE is embodied only for homogenization and the second DOE fulfils both functions, with the result that, for example, the second DOE is pivoted in and the first one is pivoted out for target recognition and the opposite takes place for a distance measurement. According to the same principle, the targeting unit 3 can have a plurality of diffractive optical elements for the different divergence production, e.g. for distance measurement and target recognition, which are able to be introduced into the beam path 20 in alternating fashion. For such alternating introduction, these elements are arranged for example in a shifting mechanism or a rotational mechanism (e.g. a turret).

As another alternative (not illustrated), the DOE 30 is able to be pivoted out of the beam path 20 completely for reflector-free measurement (or the measurement beam is deflectable completely around the DOE 30), such that the DOE 30 does not modify the measurement beam for such a type of measurement. Depending on the embodiment and measurement task, a beam homogenization may be necessary only for measurements to cooperative targets 40, that is to say the DOE 30 only needs to be arrangeable in the beam path from case to case, depending on the target type or measurement task. In measuring devices designed for measurements to both target types, that is to say cooperative and non-cooperative, the DOE 30 is thus optionally not arranged fixedly in the beam path 20, but is arrangeable in the beam path for a case-to-case homogenization and possibly production of a divergent beam 10d (e.g. by way of means for pivoting in and out or for changing the beam path).

It is to be understood that these illustrated figures only schematically illustrate possible exemplary embodiments.

Unless otherwise noted, the different approaches can be combined both with one another and also with methods and measuring devices of the prior art.

What is claimed is:

1. An optical measuring device for coordinative measurement of a target object, the optical measuring device comprising:
   at least one light source for generating at least one optical measurement beam that is pulsed; and
   a targeting unit that is rotatable relative to a base of the optical measuring device about at least one axis wherein the targeting unit defines a target axis for targeting the target object that is to be measured, and has a beam path for emitting the at least one optical measurement beam in a direction of the target object that is to be measured,
   wherein the targeting unit has at least one diffractive optical element, wherein the at least one diffractive optical element is embodied such and arranged or arrangeable in the beam path such that the at least one optical measurement beam is homogenized before emission,
   wherein for, in particular temporal, homogenization of the at least one optical measurement beam before emission, a relative position of measurement beam and the at least one diffractive optical element is dynamically, in particular periodically, variable and wherein the diffractive optical element is vibrable.

2. The optical measuring device according to claim 1, wherein the at least one diffractive optical element is embodied for mixing the measurement beam for producing a multiplicity of at least partially overlapping partial beams which are placed one next to the other.

3. The optical measuring device according to claim 1, wherein the diffractive optical element is embodied for homogenizing:
   temporal or spatial intensity distribution within the measurement beam,
   modes of the at least one optical measurement beam,
   a wavefront of the measurement beam,
   time of flight of a pulse of the measurement beam, and/or
   imaging of the at least one light source in a far field.

4. The optical measuring device according to claim 1, wherein a relative position of the at least one optical measurement beam and the at least one diffractive optical element is dynamically variable by way of the diffractive optical element being arranged or being able to be arranged movably in the beam path such that the diffractive optical element is dynamically movable over the entire measurement beam.

5. The optical measuring device according to claim 4, wherein the at least one diffractive optical element is rotatable.

6. The optical measuring device according to claim 5 wherein the at least one diffractive optical element is vibrable perpendicularly to a propagation axis of the at least one optical measurement beam and/or rotatable about a propagation axis of the at least one optical measurement beam or an axis that has a parallel offset with respect thereto.

7. The optical measuring device according to claim 1, wherein the at least one diffractive optical element:
   is arranged to be pivotable in and out with respect to the measurement beam, and/or
   has regions of different homogenization and is arrangeable differently relative to the at least one optical measurement beam, in that the at least one optical measurement beam is homogenized differently depending on the arrangement.

8. The optical measuring device according to claim 1, wherein the at least one diffractive optical element is embodied:
   for changing beam profile of the at least one optical measurement beam, and/or
   for reducing or eliminating temporal or direction-dependent inhomogeneities.

9. The optical measuring device according to claim 8, wherein the at least one diffractive optical element is embodied for changing the beam profile of the at least one optical measurement beam in a far field and/or starting from a Gaussian beam profile and/or for producing a top-hat beam profile.

10. The optical measuring device according to claim 1, wherein at least one further diffractive optical element is arranged or arrangeable in the beam path, which is embodied for homogenizing the at least one optical measurement beam.

11. The optical measuring device according to claim 1, wherein the at least one diffractive optical element is embodied for reshaping the at least one optical measurement beam into a divergent measurement beam.

12. The optical measuring device according to claim 11, wherein the at least one diffractive optical element is embodied for reshaping the at least one measurement beam into a divergent measurement beam having a divergence angle, which is matched to the field of view of a receiving optical unit of the targeting unit, in particular wherein the divergence angle is at most 3°, in particular approximately 0.075°, 0.1°, 0.2° or 1.5°, and/or wherein automatic switching of an axial focusing of the beam path between divergent and collimated is performable.

13. The optical measuring device according to claim 1, wherein:
   the targeting unit is embodied such and the diffractive optical element is arranged in the targeting unit such that the at least one optical measurement beam coming from the at least one diffractive optical element propagates as a free beam,
   the beam path is light-guide-free,
   the light source is a laser diode,
   the optical measuring device has an optoelectronic distance meter, wherein the at least one optical measurement beam is suitable for determining a distance from the target object using the optoelectronic distance meter, and/or
   the optical measuring device has automatic target recognition, with an optical divergent target recognition beam, and the at least one diffractive optical element is embodied such and arranged in a beam path of the target recognition beam such that the target recognition beam is homogenized before emission.

14. The optical measuring device according to claim 1, wherein the at least one diffractive optical element:
   is polarization-maintaining,
   is embodied in form of an optical diffuser,
   is produced by replication technology,
   consists of glass,
   is embodied in form of a hologram, and/or
   is embodied as a hybrid lens from a refractive lens having a diffractive structure.

15. The optical measuring device according to claim 1, wherein the at least one diffractive optical element is embodied for suppressing the zero order of diffraction and/or diffraction orders greater than one.

16. The optical measuring device according to claim 15, wherein the at least one diffractive optical element is embodied for suppressing the zero order of diffraction and/or diffraction orders greater than one by producing large scattering circles in the case of a diffraction for these diffraction orders, in particular with a remaining intensity of higher orders of diffraction with a proportion of less than 5% of an overall intensity.

17. A method for coordinative measurement of a target object with an optical measuring device, with targeting of the target object with a target axis of a targeting unit, wherein targeting is effected with emission of optical pulsed measurement radiation along a first beam path in a direction of the target object with an, in particular temporal, homogenization of the optical measurement radiation before emission using at least one diffractive optical element in the beam path wherein for, in particular temporal, homogenization of the optical measurement radiation before emission, a relative position of a measurement beam and the at least one diffractive optical element is dynamically, in particular periodically, varied and wherein the at least one diffractive optical element is vibrated.

18. The method according to claim 17, wherein homogenization means unifying:
   temporal or spatial intensity distribution of the optical measurement radiation,
   modes of the optical measurement radiation,
   wavefront of the optical measurement radiation, and/or
   time of flight of a pulse of the optical measurement radiation.

19. A non-transitory computer program product with program code, which is stored on a machine-readable carrier, for performing the method according to claim 17.

* * * * *